United States Patent
Malmsheimer

(10) Patent No.: US 9,983,000 B2
(45) Date of Patent: May 29, 2018

(54) METHOD AND DEVICE FOR DETERMINING THE THICKNESS OF A BRAKE DISK

(71) Applicant: Robert Bosch GmbH, Stuttgart (DE)

(72) Inventor: Roger Malmsheimer, Allmersbach Im Tal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 155 days.

(21) Appl. No.: 15/031,688

(22) PCT Filed: Sep. 30, 2014

(86) PCT No.: PCT/EP2014/070900
§ 371 (c)(1),
(2) Date: Apr. 22, 2016

(87) PCT Pub. No.: WO2015/062801
PCT Pub. Date: May 7, 2015

(65) Prior Publication Data
US 2016/0265911 A1    Sep. 15, 2016

(30) Foreign Application Priority Data

Oct. 31, 2013    (DE) .................. 10 2013 222 228

(51) Int. Cl.
*F16D 66/02* (2006.01)
*G01M 17/013* (2006.01)
*G01B 17/02* (2006.01)
*B60T 17/22* (2006.01)

(52) U.S. Cl.
CPC ............ *G01B 17/02* (2013.01); *B60T 17/221* (2013.01); *F16D 66/02* (2013.01); *F16D 66/028* (2013.01); *G01M 17/013* (2013.01)

(58) Field of Classification Search
CPC ....... G01B 17/02; B60T 17/221; B60T 17/22; F16D 66/02; F16D 66/028; F16D 66/025; F16D 66/021; F16D 66/026; G01M 17/013; G01N 29/245
See application file for complete search history.

(56) References Cited

U.S. PATENT DOCUMENTS 5,065,134 A * 11/1991 Schmid ............... B60C 23/0408
                                                        200/61.22
5,176,034 A * 1/1993 Hazony .................. G01B 17/02
                                                        73/597

(Continued)

FOREIGN PATENT DOCUMENTS

CN         101135554 A    3/2008
CN         202471026 U   10/2012

(Continued)

*Primary Examiner* — Helen Kwok
(74) *Attorney, Agent, or Firm* — Norton Rose Fulbright US LLP; Gerard Messina

(57) ABSTRACT

A method for determining the thickness of a brake disk of a pneumatic-tired vehicle, in particular a passenger vehicle or a commercial vehicle, including the steps of applying an ultrasonic measuring head on the brake disk, without dismounting the wheel associated with the brake disk; and carrying out an ultrasonic measurement for determining the thickness of the brake disk.

16 Claims, 1 Drawing Sheet

(56) References Cited

U.S. PATENT DOCUMENTS

| | | | | |
|---|---|---|---|---|
| 5,327,782 A * | 7/1994 | Sato | ............... | B60T 17/22 340/454 |
| 5,372,221 A * | 12/1994 | Jalbert | ............... | B60T 17/22 188/1.11 L |
| 5,969,239 A * | 10/1999 | Tromeur | ............... | B60C 23/043 340/443 |
| 6,065,359 A * | 5/2000 | Takanashi | ............... | F16D 66/024 73/129 |
| 6,434,512 B1 * | 8/2002 | Discenzo | ............... | F16C 19/52 702/184 |
| 2005/0236234 A1 * | 10/2005 | Ertl | ............... | B60T 17/221 188/1.11 R |
| 2006/0038669 A1 * | 2/2006 | Taguchi | ............... | B60C 23/0408 340/442 |
| 2007/0158142 A1 * | 7/2007 | Hurwic | ............... | B60T 7/107 188/1.11 L |
| 2008/0142319 A1 * | 6/2008 | Manter | ............... | B23K 1/0018 188/218 XL |
| 2009/0205910 A1 * | 8/2009 | Cahill | ............... | F16D 66/026 188/1.11 L |
| 2009/0229926 A1 * | 9/2009 | Schaefer | ............... | F16D 66/025 188/1.11 L |

FOREIGN PATENT DOCUMENTS

| | | |
|---|---|---|
| DE | 10156675 | 5/2003 |
| DE | 10211813 | 10/2003 |
| DE | 10312231 | 11/2003 |

* cited by examiner

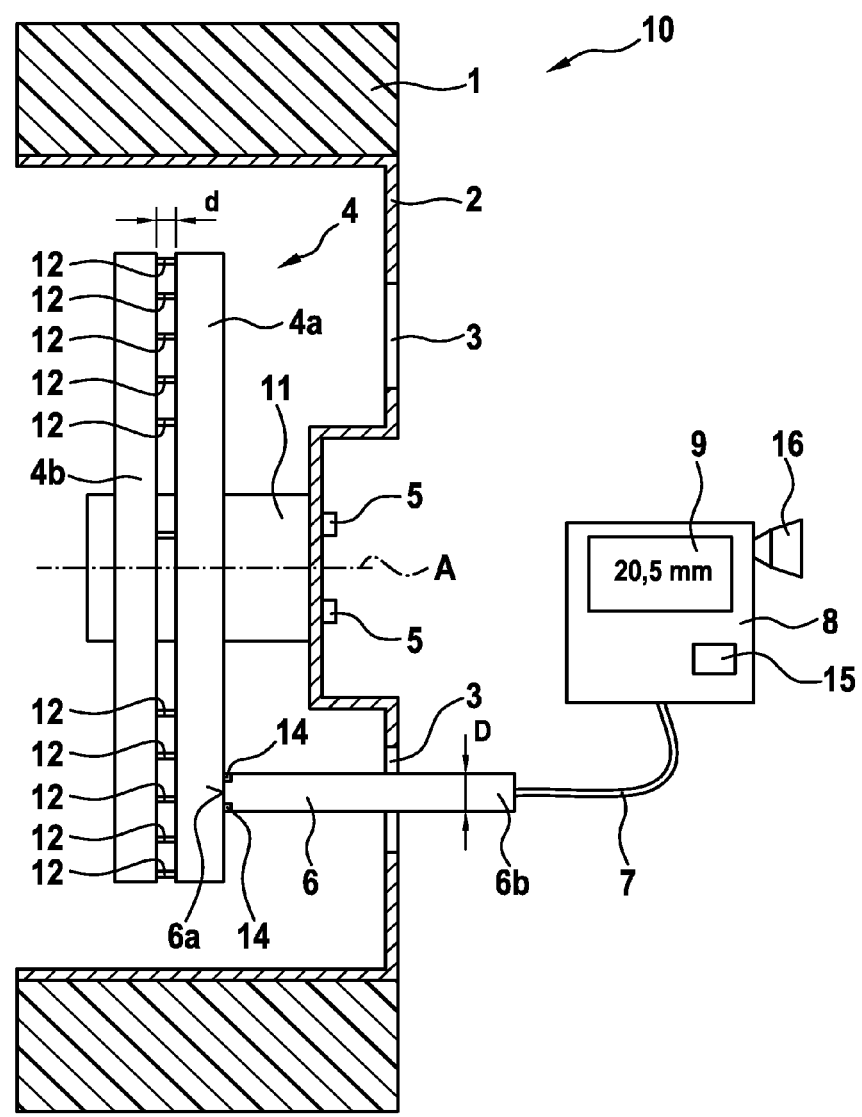

METHOD AND DEVICE FOR DETERMINING THE THICKNESS OF A BRAKE DISK

FIELD

The present invention relates to a method and a device for determining the thickness of a brake disk of a pneumatic-tired vehicle, in particular a passenger vehicle or a commercial vehicle.

BACKGROUND INFORMATION

Determining and checking the thickness of brake disks of a pneumatic-tired vehicle are important maintenance measures.

At the present time, the thickness of a brake disk is usually measured with the aid of a mechanical brake disk caliper gauge. This requires dismounting the wheel associated with the respective brake disk and mounting it again after the measurement.

German Patent Application No. DE 102 11 813 A1 describes a system permanently installed in the vehicle for measuring the thickness of brake disks and brake linings.

German Patent Application No. DE 101 56 675 A1 describes a method in which an ultrasonic sensor is placed on the brake caliper to measure the thickness of the brake lining carrier and the brake linings on one side of the brake disks. For this purpose, the brake must be applied, which requires a second person.

SUMMARY

One object of the present invention is to provide a method, which will enable a single person to easily, quickly and conveniently measure the thickness of brake disks on a pneumatic-tired vehicle. In addition, another object of the present invention is to provide a device suitable for carrying out such a method.

A method according to the present invention for determining the thickness of a brake disk on a pneumatic-tired vehicle, in particular a passenger vehicle or a commercial vehicle, includes the steps of applying an ultrasonic measuring head to the brake disk to be measured, while a wheel associated with the brake disk is mounted on the vehicle, i.e., in particular without previously dismounting the wheel associated with the brake disk to be measured and carrying out an ultrasonic measurement to determine the thickness of the brake disk.

The present invention also includes a device for determining the thickness of a brake disk of a pneumatic-tired vehicle, in particular a passenger vehicle or a commercial vehicle, the device including at least one ultrasonic measuring head, which is designed in such a way that it is insertable through an opening formed in a rim of a wheel of the vehicle to apply the ultrasonic measuring head to a brake disk of the vehicle.

The thickness (measurement) of a brake disk on a pneumatic-tired vehicle, in particular a passenger vehicle or commercial vehicle, may be carried out easily and quickly by a single person using a method according to the present invention and a device according to the present invention.

In particular, in contrast to the conventional methods of the related art, it is not necessary to dismount the inflated wheels of the pneumatic-tired vehicle in order to be able to carry out the measurement. This greatly simplifies and accelerates the measurement of the brake disk thickness.

The measurement using the method according to the present invention may also be carried out easily on a vehicle standing on the ground. In particular it is not necessary to drive the vehicle onto a car lift and raise it there.

In one specific embodiment, the method includes comparing the value of the thickness of a brake disk determined according to the present invention with a limiting value defined in advance, and outputting a visual or acoustic warning when the thickness of the brake disk drops below the predefined limiting value. Wear on the brake disk which would impair safety may be detected reliably and safely in this way.

In one specific embodiment, at least one additional sensor is provided, which is designed to detect whether the ultrasonic measuring head is situated properly on the brake disk to be measured. This makes it possible to reliably prevent faulty measurements and incorrect measured values, which may occur due to an ultrasonic measuring head being improperly positioned on the brake disk. The sensor may be designed as a mechanical sensor, for example, as a push-button, as an electrical sensor, for example, as a conductivity sensor, or as an optical sensor, for example, as a light reflection sensor.

In one specific embodiment, the ultrasonic measuring head is designed in such a way that, in so-called internally ventilated brake disks including at least two brake disk plates situated in parallel to one another and connected to one another by webs, it detects at least one of the webs and takes it into account in determining the thickness of the brake disk. Since the manufacturers specify the limiting value for the thickness of internally ventilated brake disks for the overall system of brake disk plates and the webs connecting the brake disk plates, it is possible in this way to determine a value for the thickness of the brake disk, which is directly comparable to the limiting values predefined by the vehicle manufacturers.

In one specific embodiment, the device additionally includes at least one evaluation and/or display unit, which is/are spatially separated from the ultrasonic measuring head and is designed to evaluate and display the measuring signals made available by the ultrasonic measuring head. The ultrasonic measuring head may be designed to be particularly compact due to a spatial separation of the ultrasonic measuring head from the evaluation unit and/or display unit, so that it may be positioned well on the brake disk of the vehicle even if a wheel is mounted on the vehicle in front of the brake disk. The measuring signals may be transmitted between the ultrasonic measuring head and the evaluation and/or display unit via a hardwired or wireless data link. A hardwired data link is particularly inexpensive and reliable, while a wireless data link (for example, implemented via WLAN or Bluetooth or the like) permits particularly easy handling of the ultrasonic measuring head since the mobility and handleability of the ultrasonic measuring head are not restricted by a data cable.

In one alternative specific embodiment, the evaluation and/or display unit is integrated into the measuring head, whereby a one-piece measuring device, which is particularly easy to handle, is made available.

BRIEF DESCRIPTION OF THE DRAWING

The present invention is explained in greater detail below on the basis of the FIGURE.

The FIGURE shows a schematic sectional view through a wheel 10 and a brake disk 4 of a vehicle (not shown in the FIGURE), in particular a passenger vehicle or a commercial vehicle, on which a measurement according to the present invention is carried out.

DETAILED DESCRIPTION OF EXAMPLE EMBODIMENTS

Brake disk 4 and wheel 10 are mounted on a shared axle or hub of the vehicle.

Brake disk 4, shown in the FIGURE, is a so-called internally ventilated brake disk 4, which includes two circular brake disk plates 4a, 4b situated in parallel to one another, which are mounted on the axle or hub concentrically and orthogonally to the axis of rotation A of wheel 10 and being a distance d of 5 to 15 mm, for example, in particular 10 mm from one another in the axial direction. Both brake disk plates 4a, 4b are connected to one another by multiple webs 12 extending in parallel to the axis of rotation A.

Wheel 10 is fastened on the axle or hub 11 by multiple wheel nuts 5 and includes a rim 2, which is generally made of steel or aluminum, and a pneumatic tire 1, which is situated on the outer circumference of rim 2.

Openings 3, which also permit access to brake disk 4 when wheel 10 is mounted on the axle or hub, are formed at a radial distance from the axis of rotation A in the area of rim 2, which is aligned transversely to the axis of rotation A.

A cylindrical ultrasonic measuring head 6 is guided through an opening 3 in rim 2, shown below the axis of rotation A in the FIGURE, in such a way that an end face 6a of ultrasonic measuring head 6 facing brake disk 4 rests on one side of brake disk plate 4a facing rim 2 shown at the right, so that the thickness of brake disk 4 may be measured with the aid of ultrasonic measuring head 6.

Ultrasonic measuring head 6 is preferably situated and/or designed in such a way that, of the two brake disk plates 4a, 4b, at least one area is detected, in which one of webs 12 is situated, so that the thickness of the entire system of both brake disk plates 4a, 4b and of web 12, connecting the two brake disk plates 4a, 4b to one another in this area, is determined by the measurement using ultrasonic measuring head 6.

It is advantageous when end face 6a of ultrasonic measuring head 6, which faces brake disk 4, has a preferably large surface area to detect an area of brake disk 4, in which at least one of webs 12 is formed. On the other hand, diameter D of ultrasonic measuring head 6 must be selected to be sufficiently small that ultrasonic measuring head 6 may be guided through openings 3 which are formed in rim 2 of wheel 10.

One or multiple sensors 14 may be provided in the area of end face 6a of ultrasonic measuring head 6 which faces brake disk 4. These sensors are designed to indicate whether end face 6a of ultrasonic measuring head 6 is in proper contact with the surface of brake disk 4 facing ultrasonic measuring head 6. Sensors 14 may be designed as mechanical sensors, for example, as pushbuttons, as electrical sensors, for example, as conductivity sensors or as optical sensors which are based on light reflection.

Ultrasonic measuring head 6 is connected to an evaluation unit 8 via a data link 7, which may be designed as a cable link and/or as a radio link, the evaluation unit having a display unit 9, which is designed to display the result of the measurement.

The power supply of ultrasonic measuring head 6 may be provided via data link 7 or, in the case of a wireless data link 7, via an energy source (e.g., a rechargeable battery or a solar cell) provided in ultrasonic measuring head 6.

The cylindrical shape of ultrasonic measuring head 6 shown in the figure is given only as an example. Rear area 6b of ultrasonic measuring head 6 facing away from brake disk 4 in particular may be designed as a handle and/or as a holding device to enable easy, reliable and convenient positioning and, if necessary, securing of ultrasonic measuring head 6 in a suitable position on brake disk 4.

Evaluation unit 8 may also include a storage device 15, which makes it possible to store the results of the measurements for subsequent evaluation and/or documentation purposes.

Display unit 9 may be designed in such a way that it outputs a visual alarm signal when the measured thickness of brake disk 4 drops below a predefined limiting value. Alternatively or additionally, an acoustic signal device 16 may also be provided on evaluation unit 8 to output an acoustic warning signal in this case.

Evaluation unit 8 and display unit 9 may be designed to be mobile, and in particular evaluation unit 8 and display unit 9 may be integrated into ultrasonic measuring head 6 to form a single compact unit. However, it should be noted that the dimensions of the unit are selected in such a way that ultrasonic measuring head 6 may still be guided through an opening 3 in rim 2 to be brought in contact with brake disk 4.

Alternatively, evaluation unit 8 may be designed as a module, which is separate from ultrasonic measuring head 6 and is in contact, via the hardwired or wireless data link described above, with a mobile ultrasonic measuring head 6, which in this case may have a particularly compact design, so that it may be guided particularly well through the openings 3 formed in rim 2. An evaluation unit 8, which is separate from ultrasonic measuring head 6, is particularly easily supplied with power since it may be connected permanently to the power grid. In the case of mobile units, a corresponding mobile power supply in the form of a rechargeable battery, for example, is to be provided.

What is claimed is:

1. A method for determining a thickness of a brake disk of a pneumatic-tired vehicle, the method comprising:
    applying an ultrasonic measuring head to the brake disk by inserting the ultrasonic measuring head through a rim of a wheel that is controllable by the brake disk while the brake disk and the wheel are both mounted on the vehicle; and
    carrying out an ultrasonic measurement for determining the thickness of the brake disk.

2. The method as recited in claim 1, wherein the vehicle is a passenger vehicle or a commercial vehicle.

3. The method as recited in claim 1, wherein the inserting includes guiding the ultrasonic measuring head through an opening in a face of the rim that extends approximately perpendicularly to an axis of rotation of the wheel.

4. The method as recited in claim 1, wherein the method is carried out while the vehicle is standing on the ground.

5. The method as recited in claim 1, wherein the method further comprises:
    outputting a visual or acoustic warning when the thickness of the brake disk drops below a predefined value.

6. The method as recited in claim 1, wherein the method further comprises:
    outputting a signal when the ultrasonic measuring head is applied correctly to the brake disk.

7. A device for determining a thickness of a brake disk of a pneumatic-tired vehicle, the device comprising:

an ultrasonic measuring head designed in such a way that is attachable to the brake disk by guiding the ultrasonic measuring head through an opening in a rim of a wheel that is controllable by the brake disk while the brake disk and the wheel are both mounted on the vehicle.

8. The device as recited in claim 7, wherein the vehicle is a passenger vehicle or a commercial vehicle.

9. The device as recited in claim 7, wherein the ultrasonic measuring head is designed to detect at least one web interconnecting brake disk plates of the brake disks including at least two brake disk plates which are interconnected by webs, and to it detects at least one of the webs and take the webs into account in determining the thickness of the brake disk.

10. The device as recited in claim 7, wherein the device further comprises:
    at least one of: i) an evaluation unit, and ii) a display unit, connected to the ultrasonic measuring head by a wireless or hardwired data link.

11. The device as recited in claim 10, wherein the device includes a warning device, which is designed to output a visual or acoustic warning when the thickness of the brake disk determined by the device drops below a predefined value.

12. The device as recited in claim 7, wherein the ultrasonic measuring head includes at least one sensor which is designed to detect whether the ultrasonic measuring head is positioned properly on the brake disk.

13. The device as recited in claim 1, wherein the ultrasonic measuring head includes a push-button that is engaged when the ultrasonic measuring head is properly pressed against the brake disk, and the ultrasonic measuring head is configured to output a signal responsive to the engagement by the push-button.

14. The device as recited in claim 1, wherein the opening is in a face of the rim that extends approximately perpendicularly to an axis of rotation of the wheel.

15. The method as recited in claim 1, wherein the ultrasonic measuring head includes a push-button that is engaged when the ultrasonic measuring head is properly pressed against the brake disk, and the method further comprises outputting a signal when a proper positioning of the ultrasonic measuring head is detected by the pressing of the push-button.

16. An arrangement comprising:
    a pneumatic-tired vehicle that includes an installed brake disk and an installed wheel controllable by the brake disk; and
    a device for determining a thickness of the brake disk, the device comprising an ultrasonic measuring head extending (a) from a side of a rim of the wheel that is opposite a side of the rim at which the brake disk is located, (b) through an opening in a face of the rim, and (c) to the brake disk, the face of the rim extending approximately perpendicularly to an axis of rotation of the wheel.

* * * * *